US008874571B2

(12) United States Patent
Whitney et al.

(10) Patent No.: US 8,874,571 B2
(45) Date of Patent: Oct. 28, 2014

(54) TEXT ANALYSIS METHODS, TEXT ANALYSIS APPARATUSES, AND ARTICLES OF MANUFACTURE

(75) Inventors: Paul D. Whitney, Richland, WA (US); Alan R. Willse, Richland, WA (US); Charles A. Lopresti, Richland, WA (US); Amanda M. White, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 2211 days.

(21) Appl. No.: 11/595,506

(22) Filed: Nov. 10, 2006

(65) Prior Publication Data

US 2008/0115070 A1    May 15, 2008

(51) Int. Cl.
*G06F 7/00* (2006.01)
*G06F 17/30* (2006.01)

(52) U.S. Cl.
CPC .................................. *G06F 17/3071* (2013.01)
USPC ............................ 707/731; 704/257; 704/260

(58) Field of Classification Search
USPC .......................... 707/1–10, 731; 704/257, 260
See application file for complete search history.

(56) References Cited

U.S. PATENT DOCUMENTS

| 7,185,065 | B1 * | 2/2007 | Holtzman et al. ............. 709/217 |
| 2007/0282795 | A1 * | 12/2007 | Mashinsky ........................ 707/3 |
| 2008/0010274 | A1 * | 1/2008 | Carus et al. ........................ 707/5 |
| 2008/0033587 | A1 * | 2/2008 | Kurita et al. .................. 700/100 |

OTHER PUBLICATIONS

"Assessing Significance in a Fourfold Table" Chapter 2; "Statistical Method for Rates and Proportions"; 2 ed.; Joseph L. Fleiss; 1981; pp. 19, 22-23.
"Convergence Rates for Estimation in Certain Partially Linear Models"; R. Eubank; Journal of Statistical Planning and Inference, 23: pp. 33-43; (1989).
"Categorical Data Analysis"; Alan Agresti; 2nd ed. John Wiley & Sons; 2002; pp. 1-710.

* cited by examiner

*Primary Examiner* — Hosain Alam
*Assistant Examiner* — Navneet K Ahluwalia
(74) *Attorney, Agent, or Firm* — Wells St. John P.S.

(57) ABSTRACT

Text analysis methods, text analysis apparatuses, and articles of manufacture are described according to some aspects. In one aspect, a text analysis method includes accessing information indicative of data content of a collection of text comprising a plurality of different topics, using a computing device, analyzing the information indicative of the data content, and using results of the analysis, identifying a presence of a new topic in the collection of text.

16 Claims, 4 Drawing Sheets

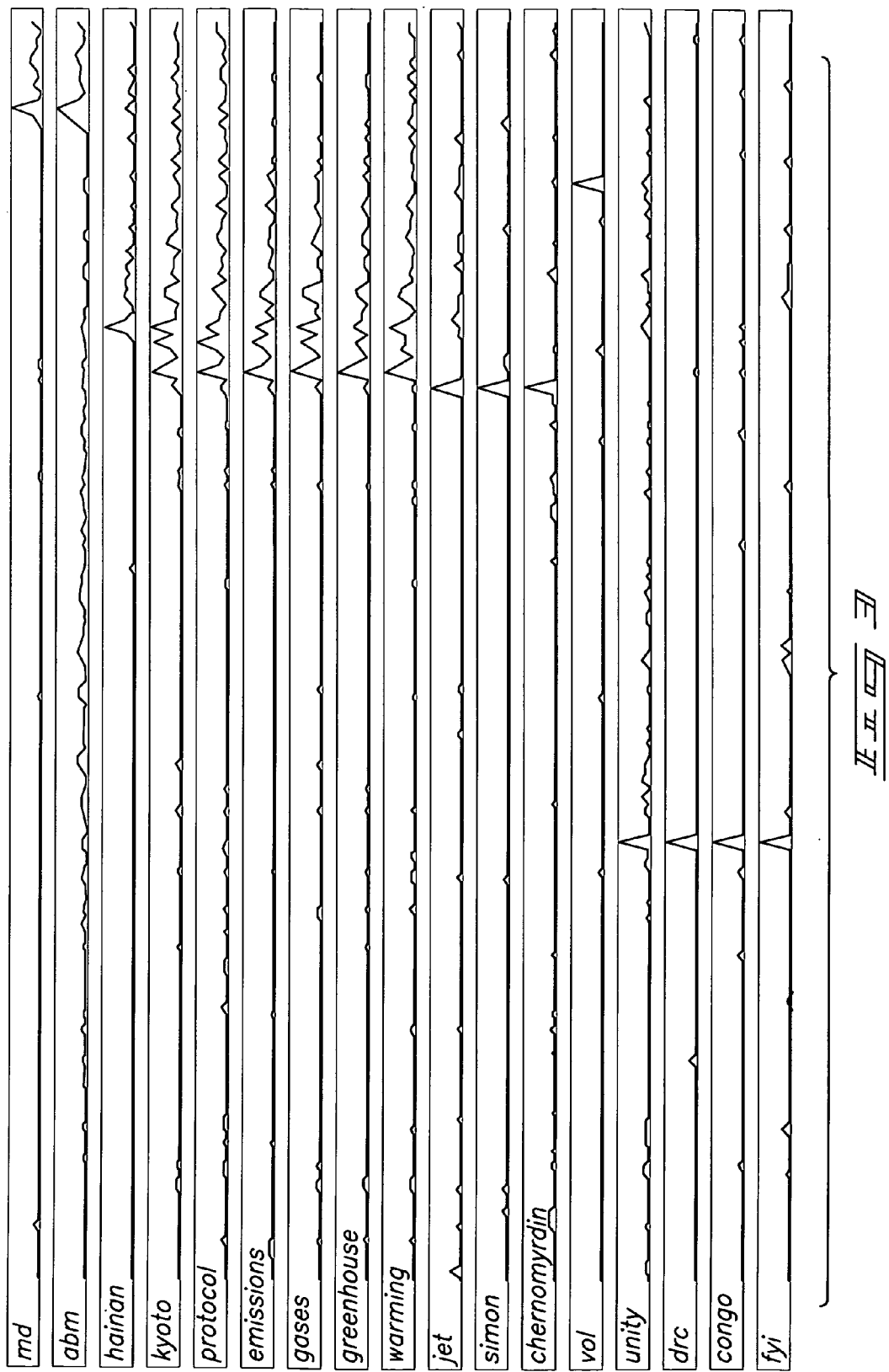

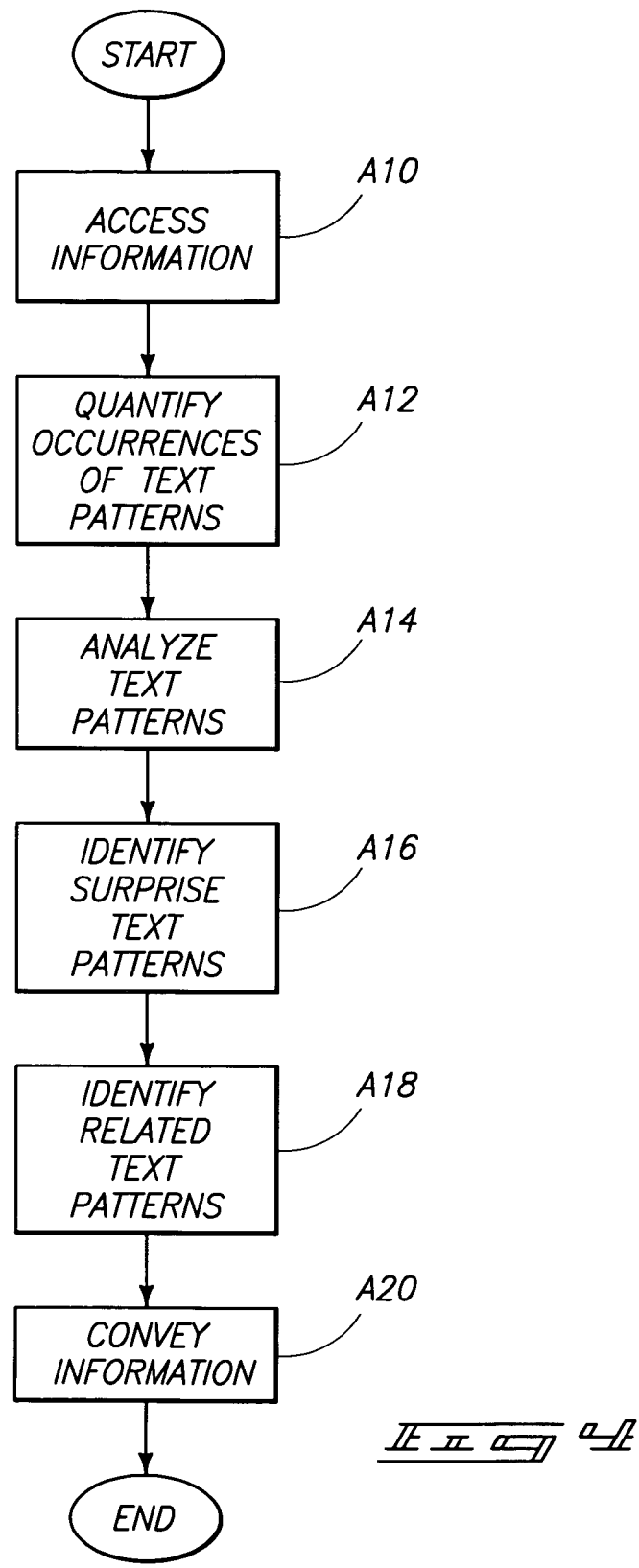

TEXT ANALYSIS METHODS, TEXT ANALYSIS APPARATUSES, AND ARTICLES OF MANUFACTURE

GOVERNMENT RIGHTS STATEMENT

This invention was made with Government support under Contract DE-AC0676RLO1830 awarded by the U.S. Department of Energy. The Government has certain rights in the invention.

TECHNICAL FIELD

This disclosure relates to text analysis methods, text analysis apparatuses, and articles of manufacture.

BACKGROUND

Text analysis tools are used by analysts for various reasons. Many tools assist analysts who may be trying to ascertain information from voluminous quantities of data which may be otherwise impractical for analysis due to the number of documents to be studied. Many text analysis tools operate on a fixed set of data which may be appropriate in a number of applications, such as common evaluation or duplication of results. Other text analysis tools may offer benefits of allowing a user to analyze collections of text which change over time, for example, from a newswire or electronic communication source (e.g., email, instant messaging, etc).

At least some embodiments of the disclosure are directed towards methods and apparatus for assisting an analyst with analysis of text.

BRIEF DESCRIPTION OF THE DRAWINGS

Embodiments of the disclosure are described below with reference to the following accompanying drawings.

FIG. 3 is an illustrative representation of temporal occurrences of text patterns of a collection of text according to one embodiment.

FIG. 4 is a flow chart of one text processing method according to one embodiment.

DETAILED DESCRIPTION

At least some embodiments of the disclosure are directed towards apparatus and methods for analyzing collections of text. In one embodiment, the collections of text being analyzed include a plurality of text items which are arranged according to an order. The collection may be static or dynamic (wherein the contents of the collections of text change over time). As described below according to some embodiments, apparatus and methods are used to identify topical changes which may occur in the collections of text. Identified topical changes may be identification of a new topic (e.g., topics present in the collection for the first time or previously present followed by an absence) or an absence of a topic which was previously present in the collection. The identified topical changes may assist analysts with respect to analysis of relatively large textual compilations by identifying topical subject matter which may be of interest. In addition, new topics may correspond to changes of topic where the new topic may have been previously present in the collection of text and perhaps thereafter absent from the collection for a period of time. The changes of topic may direct analysts to desired portions of the collections of text to review subject matter content regarding the described topics. In addition, additional information may be provided regarding identified topics to further assist users with respect to analysis of the topics (e.g., time information associated with new topics).

In one more specific example, an embodiment may be designed to monitor a collection of text for the presence of topical changes within the collection of text over a period of time. The collection may be dynamic, such as a stream of text (e.g., news feed) or messages (e.g., e-mail messages, instant messages, evolving dialogue, etc.) in a few examples. Apparatus and/or methods of the disclosure may detect topical changes in the collection of text (e.g., see discussion below regarding FIGS. 1A-1C), indicate the presence of topical changes and/or describe topical changes for an analyst in some embodiments. In other embodiments, the collection of text may be static wherein the contents of the respective collections do not change. Static collections of text may be arranged chronologically in one embodiment. Dynamic or static collections of text may be processed to indicate points in time where new topics occurred. Additional aspects and embodiments of the disclosure are described below.

Figure 1A:
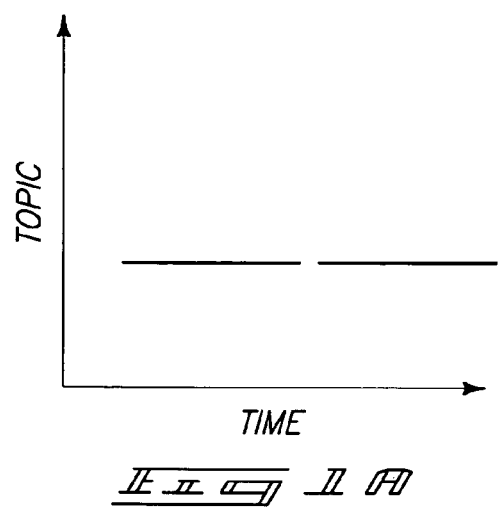
FIGS. 1A-1C are illustrative representations of types of topical discontinuities which may occur in collections of text.
Figure 1B:
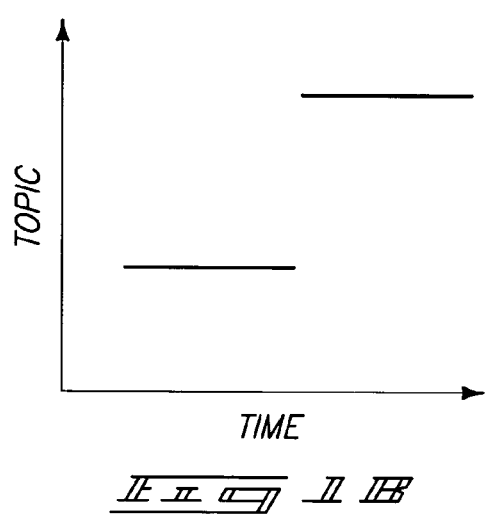
Figure 1C:
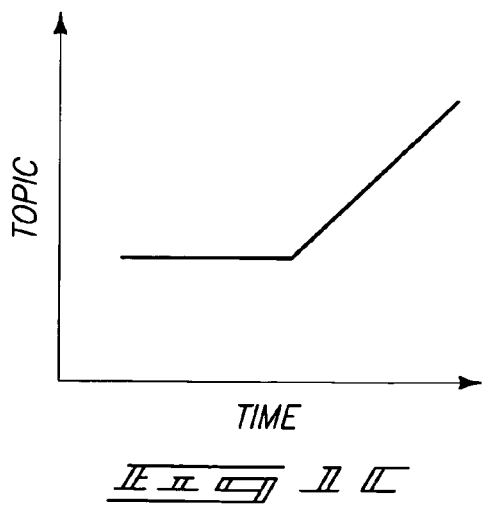

Referring to FIGS. 1A-1C, respective illustrations of different types of changes in subject matter content of a collection of text which may be detected according to some arranged embodiments of the disclosure are shown. The depicted illustrations show different changes in topic of the contents of collections of text wherein some measure of topic is shown with respect to time. FIG. 1A depicts a point discontinuity where, in the context of the respective text stream, the change may be a text item with relatively unique subject matter content. FIG. 1B depicts a jump continuity which may correspond to an abrupt change in the topical content of the text stream. Both the new occurrence or new absence of a topic may be detected in one embodiment. FIG. 1C depicts a slope discontinuity which may correspond to a ramping up (or down) in a topic for a text stream. The changes to the topics may correspond to the presence of new topics which did not previously occur in the collection of text or were previously present and then absent for a period of time or an absence of a previously existing topic. The depicted examples are for illustration and other types of changes may be detected using methods and apparatus of the disclosure. Additional details regarding discontinuities are discussed in "Convergence Rates for Estimation on Certain Partially Linear Models", *Journal of Statistical Planning and Inference*, 1989, 23:33-43 (with R. Eubank), the teachings of which are incorporated herein by reference.

Figure 2:
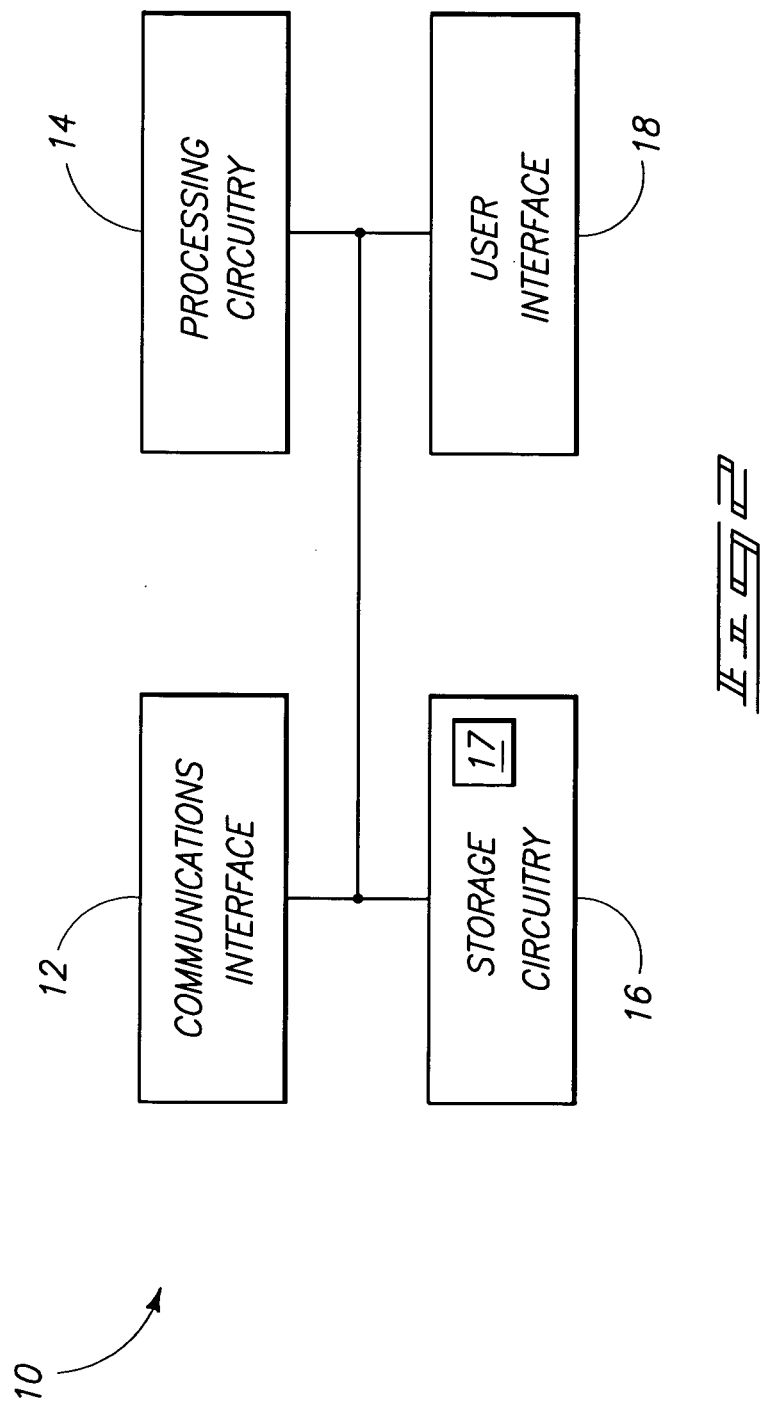
FIG. 2 is a functional block diagram of a text analysis apparatus according to one embodiment.

Referring to FIG. 2, an example of text analysis apparatus 10 is shown according to one embodiment. Text analysis apparatus 10 may be implemented as a computer, such as a personal computer or workstation in some examples. The illustrated text analysis apparatus 10 includes a communications interface 12, processing circuitry 14, storage circuitry 16 and a user interface 18. Other embodiments are possible including more, less and/or alternative structure than the depicted example.

Communications interface 12 is arranged to implement communications of apparatus 10 with respect to external devices (not shown). For example, communications interface 12 may be arranged to communicate information bi-directionally with respect to apparatus 10. The collection of text may be dynamic (e.g., new items added as they become available) or static. Communications interface 12 may be implemented as a network interface card (NIC), serial or parallel connection, USB port, Firewire interface, flash memory interface, floppy disk drive, or any other suitable arrangement for communicating with respect to apparatus 10.

Communications interface 12 may be configured to access a collection of text provided from externally of apparatus 10 in one embodiment. The communications interface 12 may receive a dynamically changing collection of text (e.g., a stream of text) and/or a static collection of text. Collections of text to be analyzed may individually include a plurality of text items which may be arranged in an order in one embodiment. Example text items may include documents (e.g., news articles, published papers, speech transcriptions, etc.), messages (e.g., e-mail messages, instant messages, text messages, etc.), or have other forms. Text items may be associated with respective temporal information regarding the text items (e.g., date information corresponding to publication) in one embodiment. Text items may be arranged chronologically in one embodiment. The text items may be arranged according to an order or associated with an order using other suitable references or criteria common to the text items (with respect to time or apart from time) in other embodiments. For example, a single document may be divided into separate chunks (e.g., each paragraph being a separate text item) and the text items may be arranged in an order from the beginning of the document to the end.

In one embodiment, processing circuitry 14 is arranged to process data, control data access and storage, issue commands, and control other desired operations. Processing circuitry 14 is configured to access and/or determine information indicative of data content of text items of a collection of text in one embodiment. The information regarding the data content may include different topics present in the collection of text. The information may include temporal occurrence information indicative of the occurrence of text items at different moments in time over a time period. As discussed with respect to illustrative embodiments below, the processing circuitry 14 may analyze the information to identify the presence of topical changes which may appear in the collection of text. Processing circuitry 14 may access the information from communications interface 12 or process received text items of the collection of text to determine the information in illustrative embodiments.

Processing circuitry 14 may comprise circuitry configured to implement desired programming provided by appropriate media in at least one embodiment. For example, the processing circuitry 14 may be implemented as one or more of a processor and/or other structure configured to execute executable instructions including, for example, software and/or firmware instructions, and/or hardware circuitry. Exemplary embodiments of processing circuitry 14 include hardware logic, PGA, FPGA, ASIC, state machines, and/or other structures alone or in combination with a processor. These examples of processing circuitry 14 are for illustration and other configurations are possible.

The storage circuitry 16 is configured to store programming such as executable code or instructions (e.g., software and/or firmware), electronic data, databases, or other digital information and may include processor-usable media. Processor-usable media may be embodied in any computer program product(s) or article of manufacture(s) 17 which can contain, store, or maintain programming, data and/or digital information for use by or in connection with an instruction execution system including processing circuitry 14 in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

At least some embodiments or aspects described herein may be implemented using programming stored within appropriate storage circuitry 16 described above and/or communicated via a network or other transmission media and configured to control appropriate processing circuitry 14. For example, programming may be provided via appropriate media including, for example, embodied within articles of manufacture 17, embodied within a data signal (e.g., modulated carrier wave, data packets, digital representations, etc.) communicated via an appropriate transmission medium, such as a communication network (e.g., the Internet and/or a private network), wired electrical connection, optical connection and/or electromagnetic energy, for example, via communications interface 12, or provided using other appropriate communication structure or medium. Exemplary programming including processor-usable code may be communicated as a data signal embodied in a carrier wave in but one example.

User interface 18 is configured to interact with a user including conveying data to a user (e.g., displaying and/or printing data for observation by the user, audibly communicating data to a user, etc.) as well as receiving inputs from the user (e.g., tactile input, voice instruction, etc.). Accordingly, in one exemplary embodiment, the user interface may include a display (e.g., cathode ray tube, LCD, etc.) configured to depict visual information and an audio system as well as a keyboard, mouse and/or other input device. Any other suitable apparatus for interacting with a user may also be utilized.

In one specific example, user interface 18 may indicate information regarding a collection of text to a user in one embodiment. For example, the user interface 18 may be controlled to convey information regarding topical content of the collection of text, including for example, indicating topical changes in the collection of text. In one example, the user interface 18 may depict a detected topical change and perhaps information regarding the topical change such as information corresponding to where the topical change occurred in a collection of text. For example, text items may be arranged according to an order and information regarding where topical changes occur in the order may be provided. In one more specific example, temporal information may be provided to a user indicative of a timing of the topical change with respect to the collection of text (e.g., indicative of a publication date of a text item of the collection of text which includes a new topic). Examples of conveyed information are discussed below in Table A. Other information regarding the collection of text may be conveyed in other embodiments.

Apparatus 10 may monitor text items in real time as the text items are made available (e.g., published) in one embodiment. Static collections are analyzed in other embodiments. In one illustrative embodiment, apparatus 10 may monitor text items arranged in chronological or other orders.

In one embodiment, apparatus 10 monitors occurrence of individual text patterns in the collection of text for changes in occurrence to identify/detect topical changes in the collection of text. Text patterns which may be monitored in one embodiment may include any arrangement of symbols (e.g., alphanumerical symbols), such as words, lemmas, abbreviations or other meaningful arrangements of symbols. The detection of a topical change, perhaps indicative of the introduction of a new topic, recurrence of a previous topic or the absence of a previously present topic, may correspond to a detected event (e.g., any event which may be reported in news, correspondence or other text). Detection of topical changes may correspond to detection of the presence of a text item, for example, comprising subject matter not present in previously analyzed text items, present to lesser degrees in previously analyzed text items, or perhaps previously present and absent for a period of time in some examples. Topical changes may also indicate an absence of a previously present topic as mentioned above.

In one embodiment, apparatus 10 utilizes a surprise statistic to analyze each text pattern which occurs in a collection of text. The surprise statistic may identify sufficiently surprising text patterns which may be used to indicate changes of topic content in one implementation. According to an additional embodiment, related text patterns may be found once a sufficiently surprising text pattern is detected. The related text patterns are related to the surprise text pattern and may be used to assist with explanation of the broader nature of the event corresponding to the topic (e.g., downed aircraft, missing person, weapons cache, etc.). Additional details regarding the surprise statistic and related text patterns are discussed below with respect to illustrative embodiments.

In one embodiment, the text items of a collection of text correspond to a period of time (e.g., from a beginning of publications occurring on a newswire to the end). The text items may have a plurality of respective dates corresponding to the text items, for example, dates of publications of the text items. The period of time of the collection of text may be arranged into a plurality of intervals, which may also be referred to as cells. The size (i.e., length of time) of the intervals are uniform and may be related to the temporal granularity of the data in one embodiment. For example, intervals may be hours, days, or weeks in one implementation. Additional details regarding usage of intervals to identify changes in topical content are described below in one embodiment.

As mentioned above, sufficiently surprising text patterns which are detected may be used to indicate events corresponding to topical changes in the collection of text (e.g., text content which changes from a political race to the presence of a meteor). Surprise text patterns and related text patterns (also referred to as explanatory text patterns) regarding detected events may be represented in a variety of ways.

For example, in one embodiment, a plurality of detected events from an EP3 corpus are shown in Table A. The detected events of Table A include surprise text patterns, related text patterns, and date and time information corresponding to the interval where the surprise text patterns were detected.

TABLE A (01/27/01 02:00:35)
surprise words:: congo drc fyi unity
related words:: compatriots congo dear dialogue drc fyi unity
(02/06/01 02:00:35)
surprise words:: chapter
related words:: bushehr chapter construction rally
surprise words:: faction
related words:: activities faction organizational organizations
(03/16/01 02:00:35)
surprise words:: age battlefield computer mankind networks warfare
related words:: age battlefield computer koizumi mankind mechanized networks warfare wave
(03/30/01 02:00:35)
surprise words:: emissions greenhouse kyoto protocol warming
related words:: carbon dioxide emissions gases greenhouse kyoto protocol warming
(04/05/01 02:00:35)

TABLE A-continued surprise words:: hainan
related words:: crew epthree hainan plane
(04/24/01 02:00:35)
surprise words:: vol
related words:: rural vol
(05/04/01 02:00:35)
surprise words:: md
related words:: abm consultations md The example of Table A illustrates events detected by apparatus 10 which correspond to new topical content of a collection of text. For example, the event at 04/05/01 02:00:35 corresponds with a description of a downed US aircraft while the event found at 03/16/01 02:00:35 corresponds with a unique document in a given collection of text. The related words increase the richness of the descriptions of the respective events.

Referring to FIG. 3, an illustrative representation is shown which depicts temporal occurrence of a number of text patterns which may occur over a period of time of the collection of text (e.g., data stream) where time increases in the horizontal direction from left to right. The illustration depicts characteristics of events present in the collection of text. For example, "half-lives" of some text patterns such as "fyi" or "congo" are much sorter than the half-lives of "Kyoto" or "protocol" in the depicted example. Text patterns "md," "abm," and "hainan" have intermediate half-lives in the illustrated data set.

The illustration contains a view of an entire time span of the collection of text in one embodiment and surprise text patterns may be identified based upon the occurrence histories of the respective text patterns shown in FIG. 3 and as discussed in further detail below. The traces of the text patterns correspond to occurrence histories of the respective text patterns in the example of FIG. 3. More specifically, the vertical components of respective traces of the text patterns correspond to the number of text items which include the respective text patterns at respective moments in time corresponding to the dates of the respective text items. For example, a spike for "vol" indicates that there is a substantially increased number of text items in the collection of text which include "vol" at the moment in time corresponding to the location of the spike compared with text items of moments in time other than the time of the spike. Put another way, "vol" appears in an increased number of text items having publication dates corresponding to the time of the spike compared with text items having other publication dates.

The depicted traces reflect single outlying points or jumps up (followed by decays down) in the illustrated example. Text patterns having occurrence histories which are similar to occurrence histories of surprise text patterns may be selected as related words of respective ones of the surprise text patterns in one embodiment. For example, if "jet" is selected as a surprise text pattern, "simon" and "chernomyrdin" may be selected as respective related words of the surprise text pattern due to the similarities of the occurrence histories of the text patterns. Additional details for selecting related text patterns of respective surprise text patterns are described below in one embodiment.

The discussion proceeds with respect to one possible implementation for identifying surprise text patterns indicative of changes of topical content in one embodiment. As mentioned previously, a surprise statistic may be used to identify surprise text patterns in one embodiment. The statistic monitors occurrence of individual text patterns to identify the surprise text patterns corresponding to topical changes (e.g., presence of new topics and/or absence of previously present topics) in one arrangement.

According to some embodiments, the surprise statistic may include one or more component. For example, a Chi-Square statistic and/or Gaussian statistic may form the surprise statistic in one possible implementation. The unit of calculation may be a single text pattern for both forms of the surprise statistic. As mentioned above according to one temporal ordering embodiment, a time period of the collection of text (e.g., corresponding to dates of the text items) may be divided into intervals in one implementation. For individual intervals, the number of text items (i.e., occurrences) which include a given text pattern are determined. This counting may be repeated for all text patterns present in the collection of text in one embodiment. The counting corresponds to the temporal occurrences of the text items and may be referred to as information indicative of data content of the collection of text. The information may be provided by processing the collection of text using processing circuitry 14 or received by apparatus 10 and accessed by processing circuitry 14 in some embodiments. Intervals defined according to other ordering criteria apart from time may be used in other embodiments.

The above-mentioned surprise statistic evaluates surprise of an individual text pattern by comparing a number indicative of occurrences of the text pattern in one of the intervals with respect to a number indicative of the number of occurrences of the respective text pattern in a window of intervals preceding the one interval in one embodiment. This analysis for the respective text pattern may be repeated for other remaining individual intervals with respect to preceding windows of occurrences as well as for other text patterns of the collection of text. In one dynamic collection of text example, the individual interval under analysis may be the most recent interval and the window may include a desired number of intervals which immediately precede the most recent interval. Other embodiments are possible.

A Chi-squared statistic may be constructed using the information indicative of data content of a collection of text. The information indicative of the data content is shown in Table B and described in Fleiss, J. L. Statistical Methods for Rates and Proportions. 2nd ed. New York: John Wiley & Sons; 1981 and Categorical Data Analysis, Alan Agresti, $2^{nd}$ ed. John Wiley & Sons, 2002, the teachings of both of which are incorporated herein by reference, in one embodiment.

TABLE B

| $x_t$ | $N_t$ |
|---|---|
| $m\overline{x}_{-t}$ | $N_{-t}$ |

For the depicted Table B, $x_t$ is the count for a number of text items which include a given text pattern within one interval at time t, $N_t$ is the total number of text items for the same interval at time t, m is the number of intervals in the window, $\overline{x}_{-t}$ is the average of the number of counts of text items which include the given text pattern in the m intervals prior to time t ($x_{-t}$ is an average of the m counts) and $N_{-t}$ is the total number of text items in the m intervals previous to time t. The Chi-squared statistic looks for deviations in a relative occurrence of $x_t$ in $N_t$ compared with relative occurrence in a preceding time window (i.e., $x_{-t}$ in $N_{-t}$ described below). In one embodiment, the apparatus 10 receives the information indicative of the data content of the collection of text (e.g., data of Table B). In another embodiment, the apparatus 10 generates the information indicative of the data content using the collection of text itself as mentioned above.

According to the presently described embodiment, a window may be defined as a predefined number of intervals prior to time t to be analyzed. In some dynamic embodiments, the time t progresses as time advances and the window of intervals for analysis may also progress. The width of an interval and the number of intervals within a window are parameters in one embodiment. For example, a length of time of an interval may be based upon the temporal granularity of the data (e.g., for a time stream of approximately daily occurring text items, a window on the order of a week or month might be appropriate in one embodiment) and the number of intervals in the window may be 10 to 50 in one embodiment. Other embodiments utilizing other parameter values are possible.

One formula which may be used for the Chi-Square statistic in one embodiment is:

$$x^2 = \frac{n_{..}(|n_{11}n_{22} - n_{12}n_{21}| - 0.5n_{..})^2}{n_1.n_2.n_{.1}n_{.2}} \quad \text{Eqn. 1}$$

and which utilizes Table C (which corresponds to Table B)

TABLE C

| $n_{11}$ | $n_{12}$ |
|---|---|
| $n_{21}$ | $n_{22}$ | and the following equations:

$$n_1 = n_{11} + n_{12} \quad \text{Eqn. 2}$$

$$n_2 = n_{21} + n_{22} \quad \text{Eqn. 3}$$

$$n_1 = n_{11} + n_{21} \quad \text{Eqn. 4}$$

$$n_2 = n_{12} + n_{22} \quad \text{Eqn. 5}$$

$$n = n_{11} + n_{12} + n_{21} + n_{22} \quad \text{Eqn. 6}$$

The above-described example form of the Chi-Square statistic incorporates a continuity correction 0.5/n. Additional details are described in "Statistical Methods for Rates and Proportions", Fleiss, J. L., $2^{nd}$ ed. New York: John Wiley & Sons, 1981, the teachings of which are incorporated herein by reference.

A Gaussian surprise statistic is another statistic which may be used by itself or in combination with the Chi-Square statistic in additional embodiments. A Gaussian statistic is based on a comparison of the observed value $x_t$ with the average over the values in $x_{-t}$ normalized by a standard deviation of values in $x_{-t}$. A floor of 1.0 on standard deviation may be used in one embodiment since count data is used, that is, the standard deviation is bounded below a fixed value (such as 1.0) to account for the case when all the counts are zero and identical. One formula for the Gaussian surprise statistic is:

$$(x_t - \overline{x}_{-t})/(s*(1+1/n))] \quad \text{Eqn. 7}$$

where $x_t$ is the count for a number of text items which include a given text pattern within interval t, $x_{-t}$ is the average of the number of counts of the given text pattern in intervals prior to time t, n is the number of intervals in the window and s is the standard deviation.

The Chi-Square, Gaussian and/or other statistics may be used to detect the presence of surprise text patterns (e.g., topical outliers for example shown in FIG. 1) in the collection of text corresponding to topical changes (e.g., presence or absence of a topic) in one embodiment. In one embodiment, the above-mentioned Chi-Square and Gaussian statistics are combined to identify the surprise text patterns by adding a square root of the Chi-Square result with the absolute value of the Gaussian result. Values in ranges between 5 and 50 were used to identify the surprise text patterns and to isolate events of the collection of text which may be interesting. Selection of a surprise text pattern may indicate the presence of a topical change corresponding to the surprise text pattern which may also correspond to a detected event. Time information associated with the presence of the topical change (or other information regarding the type of ordering being used) may also be provided. In one embodiment, the time information may correspond to an interval of the time period analyzed when the topical change was detected.

As mentioned above, one or more related text patterns may be identified for respective surprise text patterns. The related text patterns may be used to provide additional information for the surprise text patterns. In one embodiment mentioned above, text patterns having occurrence histories which are similar to an occurrence history of a surprise text pattern may be selected as related text patterns for the respective surprise text pattern.

Similarities between text patterns of a collection of text may be based on vectors indicative of temporal occurrences of the text patterns (e.g., vectors indicative of the temporal occurrences of text patterns for example as shown in FIG. 3). The vectors may include a plurality of numbers or values which indicate the numbers of text items of the collection of text which include the respective text pattern at the respective moments in time (i.e., intervals). For example, distances between an identified surprise text pattern and remaining text patterns of the collection of documents may be calculated using the temporal occurrence vectors. In one embodiment, a distance between two vectors may be based on a correlation function between the vectors. In one more specific embodiment for two vectors x, y, distance may be calculated as $1-|corr(x,y)|$. In one example, a predetermined number of text patterns which are closest to a surprise text pattern may be selected as related text patterns in one configuration.

Referring to FIG. 4, a method of analyzing a collection of text is described according to one embodiment. The method may be implemented using processing circuitry 14 in one embodiment. Other methods are possible which may include more, less and/or alternative acts.

In an act A10, information regarding a collection of text may be accessed. The accessed information may be the collection of text itself which is received by apparatus 10.

In an act A12, occurrences of a plurality of text patterns occurring in the collection of text are determined. For example, the collection of text may include a plurality of text items associated with time intervals or other ordering criteria as discussed above. In one embodiment, numbers of text items including respective text patterns are determined for each of the intervals.

In an Act A14, the text patterns are analyzed. For example, the numbers of occurrences of text patterns may be used in statistical analysis, such as Chi-Square and/or Gaussian analyses, in one embodiment.

In an Act A16, the analysis of act A14 identifies one or more surprise text patterns which correspond to a topical change (e.g., presence of a new topic or absence of a previously present topic) in a given interval of the collection of text in one embodiment.

In an Act A18, text patterns which are related to respective ones of the surprise text patterns may be identified. The related text patterns assist with explaining topics associated with respective surprise text patterns in one embodiment.

In an Act A20, information regarding the analysis of the collection of text may be conveyed to a user. In one embodiment, the conveyed information may indicate new topics appearing in the collection of text and may resemble the contents of Table A.

Text analysis apparatus 10 is configured to provide information regarding events of a collection of documents in one embodiment. As described above in one arrangement, text analysis apparatus 10 provides topical information regarding events which may correspond to a topical change in a collection of documents. Apparatus 10 may provide identification information, descriptive information, and information indicative of time (e.g., date of publication) regarding detected events in one configuration. In one embodiment, text analysis apparatus 10 may include an event detection module, for example, which may interface with In-Spire™ software available from Pacific Northwest National Laboratory, or other text analysis software, to extract data/time stamp information associated with text items, and word frequency information indicative of words which are present within the text items.

The surprising analysis described above provides a measure of interestingness of a text pattern in a collection of text (e.g., a word in a time sequence of documents) in one embodiment. The surprise statistic may provide information in addition to information provided by other forms of text analysis. For example, In-Spire™ uses topicality as a measure of how interesting a word is and the temporal interestingness information provided using the surprise statistic does not appear to be available from the In-Spire™ topicality metric or correlated therewith. The surprising analysis discussed herein according to illustrative embodiments may be used alone or in combination with other tools to analyze a collection of text.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A computer-implemented text analysis method comprising:
    accessing a plurality of text items regarding a plurality of different topics, wherein the text items were published over a time period;
    dividing the time period into a plurality of intervals;
    using dates of publication of the text items, associating the text items with the time intervals;
    for individual ones of the intervals, counting a number of the text items which include a given text pattern;

comparing the counted numbers of text items which include the given text pattern for the individual intervals with one another; and identifying a topical change in the text items using results of the comparing.

2. The method of claim 1 wherein the text items are arranged according to a chronological order.

3. The method of claim 1 wherein the identifying comprises identifying an absence of one of the topics which was previously present in the text items.

4. The method of claim 1 wherein the identifying comprises identifying a presence of the given text pattern in at least one of the text items which was not previously present in the text items, and wherein the topical change comprises the given text pattern.

5. The method of claim 1 wherein the identifying comprises identifying a presence of a new one of the topics within the text items which was not previously present in the text items.

6. The method of claim 1 wherein the identifying comprises identifying the presence of a new one of the topics within the text items of one of the intervals, and wherein the new topic has not been identified as a topic prior to the one interval.

7. The method of claim 1 wherein the identifying comprises identifying a recurrence of one of the topics in the text items following an absence of the one topic which was previously present in the text items.

8. The method of claim 1 further comprising identifying additional text of the text items to provide additional information regarding the topical change in addition to information provided by one of the text items which includes the given text pattern.

9. The method of claim 1 wherein the identifying additional text comprises identifying using the given text pattern.

10. The method of claim 1 further comprising providing time information regarding the presence of the topical change using time information corresponding to one of the intervals.

11. The method of claim 1 wherein the comparing comprises comparing one of the counted numbers for the text items having dates of publication within one of the intervals with another of the counted numbers for the text items having dates of publication within another of the intervals.

12. The method of claim 11 wherein the one interval is a most recent interval of time and the another interval is a previous interval of time before the most recent interval of time.

13. The method of claim 12 wherein the topical change is the given text pattern which is present in the most recent interval of time and was not present in the intervals prior to the most recent interval of time.

14. The method of claim 1 wherein the topical change is the given text pattern, and wherein the processing circuitry is further configured to identify the given text pattern as the topical change as a result of an increased occurrence of the given text pattern in the text items which have dates of publication within one of the intervals compared with previous intervals.

15. A text analysis apparatus comprising:
a user interface configured to communicate information to a user; and
processing circuitry configured to:
access a plurality of text items regarding a plurality of different topics, wherein the text items were published over a time period;
divide the time period into a plurality of intervals;
use dates of publication of the text items to associate the text items with the time intervals;
for individual ones of the intervals, count a number of the text items which include a given text pattern;
compare the counted numbers of text items which include the given text pattern for the individual intervals with one another;
use results of the comparison of the counted numbers of text items to identify a topical change in the text items; and
control the user interface to communicate the topical change to the user.

16. An article of manufacture comprising:
non-transitory storage media storing programming configured to cause processing circuitry to perform processing comprising:
accessing a plurality of text items regarding a plurality of different topics, wherein the text items were published over a time period;
dividing the time period into a plurality of intervals;
using dates of publication of the text items, associating the text items with the time intervals;
for individual ones of the intervals, counting a number of the text items which include a given text pattern;
comparing the counted numbers of text items which include the given text pattern for the individual intervals with one another; and
identifying a topical change in the text items using results of the comparing.

* * * * *

UNITED STATES PATENT AND TRADEMARK OFFICE
CERTIFICATE OF CORRECTION

PATENT NO. : 8,874,571 B2
APPLICATION NO. : 11/595506
DATED : October 28, 2014
INVENTOR(S) : Paul D. Whitney et al.

It is certified that error appears in the above-identified patent and that said Letters Patent is hereby corrected as shown below:

In the specification

Column 6, line 26 – Replace "much sorter than" with --much shorter than--

Column 8, lines 30-38 – Replace:

"$n_1 = n_{11} + n_{12}$  Eqn. 2

$n_2 = n_{21} + n_{22}$  Eqn. 3

$n_1 = n_{11} + n_{21}$  Eqn. 4

$n_2 = n_{12} + n_{22}$  Eqn. 5

$n = n_{11} + n_{12} + n_{21} + n_{22}$  Eqn. 6"

with:

--$n_{1.} = n_{11} + n_{12}$  Eqn. 2

$n_{2.} = n_{21} + n_{22}$  Eqn. 3

$n_{.1} = n_{11} + n_{21}$  Eqn. 4

$n_{.2} = n_{12} + n_{22}$  Eqn. 5

$n_{..} = n_{11} + n_{12} + n_{21} + n_{22}$  Eqn. 6--

Column 8, line 56 – Replace:

" $(x_t - \overline{x_{-t}})/(s^*(1 + 1/n)]$  Eqn. 7"

with:

-- $(x_t - \overline{x_{-t}})/(s^*(1 + 1/n))$  Eqn. 7--

In the claims

Column 11, line 35 – Replace "claim 1 wherein" with --claim 8 wherein--

Signed and Sealed this
Twenty-eighth Day of June, 2016

Michelle K. Lee
*Director of the United States Patent and Trademark Office*